United States Patent Office 3,629,234
Patented Dec. 21, 1971

3,629,234
ESTRADIOL-17β-RHAMNOSIDES
Wolfgang Eberlein, Biberach (Riss), Joachim Heider, Warthausen-Oberhofen, and Hans Machleidt and Gunther Engelhardt, Biberach (Riss), Germany, assignors to Boehringer Ingelheim G.m.b.H., Ingelheim am Rhine, Germany
No Drawing. Filed May 1, 1969, Ser. No. 821,558
Claims priority, application Germany, May 3, 1968,
P 17 68 350.0–42
Int. Cl. C07c 173/00
U.S. Cl. 260—210.5
9 Claims

ABSTRACT OF THE DISCLOSURE

Estrogenic estradiol-17β-rhamnosides of the formula

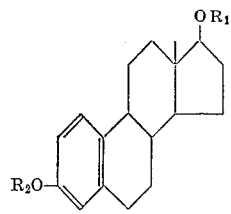

wherein $R_1$ is

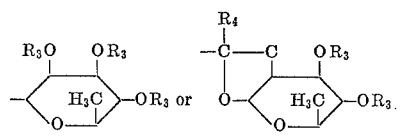

where $R_3$ is hydrogen or lower alkanoyl, preferably acetyl, and
$R_4$ is lower alkyl, preferably methyl, and
$R_2$ is hydrogen, lower alkyl, lower alkanoyl, benzyl, tetrahydropyranyl or $MeO_3S$—, where Me is an alkali metal; the compounds are useful for the treatment of the menopausal syndrome, amenorrhea, endometritis and colpitis.

---

This invention relates to novel derivatives of estradiol-17β-rhamnosides, as well as to various methods of preparing these compounds.

More particularly, the present invention relates to estradiol-17β-rhamnoside derivatives of the formula

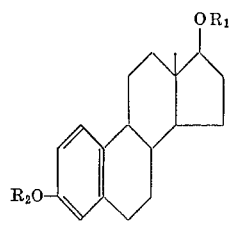

(I)

wherein $R_1$ is

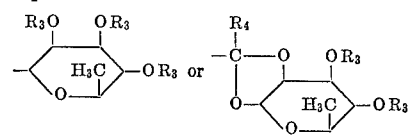

where $R_3$ is hydrogen or lower alkanoyl, preferably acetyl, and
$R_4$ is lower alkyl, preferably methyl, and
$R_2$ is hydrogen, lower alkyl, lower alkanoyl, benzyl, tetrahydropyranyl or $MeO_3S$—, where Me is an alkali metal.

The compounds of the Formula I above may be prepared by various methods involving known chemical principles, such as by the methods described by Ch. Meystre and K. Miescher in Helv. Chim. Acta 27, 231, 1153 (1944), and M. Mazurek and A. S. Perlin, Canad. J. Chem. 43, 1918 (1965).

Method A

For the preparation of a compound of the Formula I wherein $R_1$ has the meanings defined above and $R_2$ has the same meanings as in Formula I except $MeO_3S$—, by reacting a compound of the formula

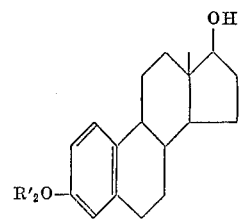

(II)

wherein $R'_2$ has the same meanings as $R_2$ in Formula I except $MeO_3S$—, with a tri-O-acyl-α-L-rhamnopyranosyl halide of the formula

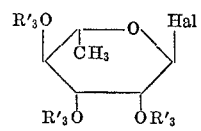

(III)

wherein $R'_3$ is lower alkanoyl and Hal is halogen.

The reaction is preferably carried out in an organic solvent in the presence of a tertiary heterocyclic base, such as pyridine or 2,6-lutidine, preferably at temperatures between 0° and 25° C., where an excess of the tertiary base may serve simultaneously as the solvent medium.

The reaction may also be carried out in the presence of a heavy metal salt or a heavy metal oxide and in an inert organic solvent, such as benzene, and most advantageously at the boiling point of the solvent. Preferred examples of a heavy metal salt are oxides, cyanides or carbonates of silver or mercury. The preferred manner of performing the reaction is to admix a solution of a compound of the Formula II in the solvent with a suspension of the heavy metal salt or heavy metal oxide in the solvent, heat the resulting mixture to the boiling point of the solvent, and add a solution of the tri-O-acyl-α-L-rhamnopyranosyl halide in the solvent dropwise to the boiling mixture while distilling off a portion of the solvent azeotropically.

This method initially yields a mixture of two compounds of the Formula I, where in one case $R_1$ is a rhamnopyranosyl-triacyl group, and in the other case it is a rhamnopyranosylorthoesterdiacyl group. As the acylated derivatives cannot be separated chromatographically, these compounds are subsequently hydrolized according to known methods. The hydrolysis is carried out with alkalis under mild conditions at room temperature, for example, with potassium carbonate, potassium hydroxide, sodium hydroxide or ammonia in methanolic solution or with sodium methylate, potassium methylate or barium methylate in ethanol. The rhamnopyranosyl and rhamnopyranosylorthoester compounds obtained are then separated in the conventional way by means of column-chromatography, preferably in a 15% deactivated silicagel column; benzene is preferably used as the solvent to which increasing quantities of ethylacetate are added.

In the compounds of the Formula I thus obtained, the free hydroxyl groups of the rhamnopyranosyl groups may subsequently be acylated, if desired, according to known methods. The acylation is performed with an acyl halide, a symmetric anhydride or a mixed anhyride of the corresponding carbonic acid and a carbonic acid monoester, advantageously at room temperature in an inert solvent, and preferably in the presence of an acid binding agent, such as inorganic or tertiary organic bases.

The ratio in which the rhamnopyranosyltriacylate and rhamnopyranosylorthoesterdiacylate are formed depends upon the type of the solvent used, upon the type and consistency of the applied catalyst and upon the substituent $R_2$ on the phenolic hydroxyl group. By making a suitable choice of these three factors, one may achieve in some cases that one of the two possible compounds is obtained with a high yield, so that a chromatographic separation is unnecessary. If, for instance, 3-methoxy-17β-estrol is reacted in the presence of commercial aged silver carbonate, practically pure estradiol-17β - rhamnosidetriacylate - 3-methylester will be formed, whereas if freshly precipitated silver carbonate is used, practically pure estradiol-17β-rhamnosidorthoesterdiacylate - 3 - methylether will be formed. However, if instead of the 3-methoxy compound the 3-benzyloxy compound is used, a mixture of rhamnoside-triacylate and rhamnoside-orthoesteridacylate is formed. Pure rhamnoside-orthoesterdiacylate is, for instance, also obtained if a 3-acyloxy-compound or a 3-tetrahydropyranyloxy compound is reacted in the presence of commercial silver carbonate with an acyl halide of the Formula III.

If, according to this method, compounds of Formula I are obtained wherein $R_2$ represents benzyl or an acyl group, they may be converted, if desired, into the corresponding compounds wherein $R_2$ is hydrogen according to known methods.

The benzyl group may be split off by means of catalytic hydrogenation, preferably in glacial acetic acid and in the presence of a palladium catalyst; an acyl group may be replaced by hydrogen by means of a mild alkaline hydrolysis, for example, by stirring at room temperature with a methanolic solution of potassium carbonate, potassium hydroxide, sodium hydroxide or ammonia, or with a solution of sodium methylate, potassium methylate or barium methylate in ethanol. The removal of the acyl group in 3-position simultaneously splits off any possibly present acyl substituents on the rhamnoside group.

Method B

By alkylating or acylating a compound of the formula

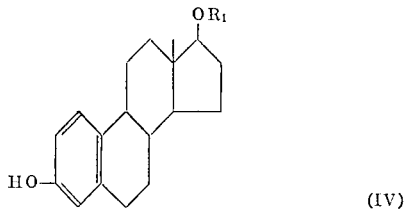

(IV)

wherein $R_1$ has the same meanings as in Formula I, as the phenolic hydroxyl group in the 3-position with a conventional alkylating or acylating agent.

If $R_2$ in Formula I is to be lower alkanoyl, the compound of the Formula IV is acylated by conventional methods with a lower alkanoyl halide. If $R_2$ in Formula I is to be lower alkyl, the compound of the Formula IV is alkylated pursuant to conventional methods with a di-lower alkyl sulfate or a lower alkyl halide in the presence of an acid-binding agent. If $R_2$ in Formula I is to be tetrahydropyranyl, the compound of the Formula IV is reacted with dihydropyran in the presence of an aromatic sulfonic acid. Finally, if $R_2$ in Formula I is to be MeO$_3$S—, the compound of the Formula IV is reacted with amidosulfonic acid in an inert organic solvent and in the presence of a tertiary organic base. The tertiary organic base, such as pyridine, may also simultaneously serve as the solvent medium if it is provided in sufficient excess over and above the stoichiometrically required amount. Subsequently, the sulfuric acid semiester formed thereby is transformed into the desired alkali metal salt by treatment with an alkali metal hydroxide, such as methanolic sodium hydroxide or potassium hydroxide. During this sulfation of the hydroxyl group in the 3-position, the acyl radicals $R'_3$ of the rhamnopyranosyl moiety are simultaneously split off.

If desired, those compounds of the Formula I wherein the radicals $R_3$ are lower alkanoyl which are obtained as end products in methods A and B, may subsequently be hydrolized pursuant to known methods. This hyrolysis may be effected with alkalis under gentle conditions at room temperature, for instance, with potassium carbonate, potassium hydroxide, sodium hydroxide or ammonia in methanolic solution, or with sodium methylate, potassium methylate or barium methylate in ethanolic solution, as described above.

On the other hand, if the above methods yield a compound of the Formula I with free hydroxyl groups attached to the rhamnopyranosyl moiety, for example, after sulfation of the hydroxyl group in the 3-position, these free hydroxyl groups may, if desired, be acylated pursuant to known methods, such as with an alkanoyl halide, a symmetric anhydride or a mixed anhydride of the corresponding carboxylic acid and a carbonic acid monoester. The acylation is advantageously carried out at room temperature in an inert organic solvent and preferably in the presence of an acid-binding agent, such as an inorganic or tertiary organic base, as described above.

The starting compounds of the Formula II are known; the starting material of Formula IV may be prepared according to method A above, preferably via the corresponding 3-benzyloxy compound.

The following examples further illustrate the present invention and will enable others skilled in the art to understand it more completely. It should be understood, however, that the invention is not limited solely to the particular examples given below.

EXAMPLE 1

(I) 3-benzyloxy-estra-1,3,5(10)-triene-17β-yl-1',2'-O-orthoacetyl-L-rhamnopyranoside (II) 3-benzyloxy-estra-1,3,5(10)-triene-17β-yl-L-rhamnopyranoside A solution of 10 gm. of α-acetobromorhamnose in 180 ml. of absolute benzene was dropwise added over a period of two hours to a mixture of 5.4 gm. of 3-benzyloxy-17β-estradiol and 30 gm. of Ag$_2$CO$_3$ in 200 ml. of benzene, while 30–40 ml. of benzene were distilled out of the reaction mixture simultaneously. The reaction solution was then refluxed for another two hours. Thereafter, the silver carbonate was filtered off, and the filtrate was evaporated to dryness in vacuo at 50 °C. The obtained crude product was dissolved without further purification in 250 ml. of methanol, and the solution was admixed with 4 gm. of K$_2$CO$_3$ in 5 ml. of water. After two hours of standing the reaction solution was diluted with water and extracted with chloroform several times. The chloroform extracts were dried with Na$_2$SO$_4$ and evaporated to dryness in vacuo. The residue was separated by chromatography on silicagel (15% deactivated) with benzene, to which increasing quantities of ethylacetate were added, into the two components I and II. Both compounds were recrystallized from benzene/petroleum ether. (I) M.P. 168–172° C. Yield: 1.5 gm. (18% of theory). (II) M.P. 179–181° C. Yield: 1.3 gm. (17% of theory).

EXAMPLE 2

3-benzyloxy-estra-1,3,5(10)-triene-17β-yl-2',3',4'-tri-O-acetyl-L-rhamnopyranoside 1.4 gm. of the 3-benzyloxy-estra-1,3,5(10)-triene-17β-yl-L-rhamnopyranoside, obtained as described in Example 1 (II), were dissolved in 14 ml. of pyridine, and the solution was cooled to 0° C. and then admixed slowly with 14 ml. of acetanhydride. After standing overnight at room temperature, the reaction mixture was poured into 1 liter of ice-water, and the aqueous mixture was extracted several times with chloroform. The united chloroform extracts were washed successively with dilute sulfuric acid, saturated aqueous sodium bicarbonate solution, and water. The organic phase was dried over sodium sulfate and evaporated in vacuo to dryness, and the residual crude product was recrystallized from methanol. M.P. 183–186° C. Yield: 1.2 gm. (69% of theory).

EXAMPLE 3

2-hydroxy-estra-1,3,5(10)-triene-17β-yl-2',3',4'-tri-O-acetyl-L-rhamnopyranoside 1.2 gm. of the 3-benzyloxy-estra-1,3,5(10)-triene-17β-yl-2',3',4'-tri-O-acetyl-L-rhamnopyranoside, prepared as described in Example 2, were dissolved in 300 ml. of ethanol in the presence of 0.19 ml. of glacial acetic acid, and the solution was shaken in the presence of 0.6 gm. of palladized charcoal (10%) for two hours in a hydrogen atmosphere. After the absorption of hydrogen had ceased, the reaction mixture was diluted with 1 liter of water and extracted several times with chloroform. The chloroform extracts were washed first with saturated aqueous sodium bicarbonate solution and then with water, dried with $Na_2SO_4$ and evaporated to dryness in vacuo. The residual crude product was recrystallized from ethanol. M.P. 211–212° C. Yield: 0.93 gm. (90% of theory).

EXAMPLE 4

3-hydroxy-estra-1,3,5(10)-triene-17β-yl-L-rhamnopyranoside 1.25 gm. of the 3-hydroxy-estra-1,3,5(10)-triene-17β-yl-2',3',4'-tri-O-acetyl-L-rhamnopyranoside, prepared as described in Example 3, were dissolved in methanol, and the solution was admixd with 0.47 gm. of $K_2CO_3$ in 0.5 ml. of water. After two hours of standing the reaction solution was diluted with water at room temperature and extracted several times with chloroform. After drying with $Na_2SO_4$, the choloroform extracts were evaporated to dryness in vacuo. 800 mg. of crude product were obtained, with was purified by chromatography on silicagel (15% deactivated) with benzene/ethylacetate and then recrystallized from acetone/petroleum either. M.P. 249–251° C. (sintering beginning at 238° C.). Yield: 420 mg. (44% of theory).

EXAMPLE 5

3-benzyloxy-estra-1,3,5(10)-triene-17β-yl-1',2'-O-ortho-acetyl-3',4'-di-O-acetyl-L-rhamnopyranoside 1.6 gm. of the 3-benzyloxy-estra-1,3,5(10)-triene-17β-yl-1',2' - O - orthoacetyl-L-rhamnopyranoside, obtained as described in Example 1, were dissolved in 60 ml. of pyridine, and the solution was cooled to 0° C. and then admixed slowly with 16 ml. of acetanhydride. The reaction mixture was allowed to stand overnight at room temperature, poured into one liter of ice-water, the aqueous mixture was extracted several times with chloroform, and the united chloroform extracts were washed successively with dilute sulfuric acid, saturated aqueous sodium bicarbonate solution, and water, dried over sodium sulfate, and evaporated to dryness in vacuo. M.P. 132–142° C. (the crude product was used in Example 6 without further purification). Yield: 1.5 gm. (81% of theory).

EXAMPLE 6

3-hydroxy-estra-1,3,5(10)-triene-17β-yl-1',2'-O-ortho-acetyl-3',4'-di-O-acetyl-L-rhamnopyranoside 1.5 gm. of the 3-benzyloxy-estra-1,3,5(10)-triene-17β-yl-1',2'-O-orthoacetyl - 3',4' - di - O - acetyl - L - rhamnopyranoside, obtained as described in Example 5, were dissolved in 300 ml. of ethanol in the presence of 0.24 ml. of glacial actic acid, and the solution was shaken in the presence of 0.75 gm. of palladized charcoal (10%) for two hours in a hydrogen atmosphere. After the absorption of hydrogen had ceased, the reaction mixture was diluted with one liter of water and extracted with chloroform several times. The chloroform extracts were washed with saturated aqueous sodium bicarbonate solution and with water, dried with $Na_2SO_4$ and evaporated to dryness in vacuo. The residual crude product was recrystallized from ethanol/petroleum ether. M.P. 211–213° C. Yield: 1.25 gm. (98% of theory).

EXAMPLE 7

3-hydroxy-estra-1,3,5(10)-triene-17β-yl-1',2'-O-ortho-acetyl-L-rhamnopyranoside 0.95 gm. of the 3-hydroxy-estra-1,3,5(10)-triene-17β-yl-1',2'-O-ortho-acetyl-3',4'-di-acetyl - L - rhamnopyranoside, prepared as described in Example 6, were dissolved in 200 ml. of methanol, and the solution was admixed with a solution of 0.35 gm. of $K_2CO_3$ in 0.5 ml. of water. After standing at room temperature for two hours, the reaction solution was diluted with water and extracted with chloroform several times. The chloroform extracts were dried with $Na_2SO_4$, evaporated to dryness in vacuo, and the residue was purified by chromatography on silicagel (15% deactivated). M.P. 187° C. (sintering); 205° C. (melting). Yield: 200 mg. (25% of theory).

EXAMPLE 8

3-tetrahydropyranyloxy-estra-1,3,5(10)-triene-17β-yl-1',2'-O-ortho-acetyl-3',4'-di-O-acetyl-L-rhamnopyranoside A solution of 5 gm. of α-acetobromorhamnose in 60 ml. of absolute benzene was added dropwise over a period of two hours to a mixture of 2.0 gm. of 17β-estradiol-3-tetrahydropyranyl-ether and 5 gm. of commercial silver-carbonate in 50 ml. of absolute benzene at the boiling temperature of the solvent, while 15 ml. of benzene were distilled out of the reaction mixture simultaneously. The reaction mixture was then refluxed for another two hours. Thereafter, the silver carbonate was filtered off and the filtrate was evaporated to dryness in vacuo.

The residual crude product was purified by chromatography on silicagel (15% deactivated), and then recrystallized from ethanol/water. M.P. 92–96° C. Yield: 2.7 gm. (75.5% of theory).

EXAMPLE 9

3-acetoxy-estra-1,3,5(10)-triene-17β-yl-1',2'-O-ortho-acetyl-3',4'-di-O-acetyl-L-rhamnopyranoside A solution of 2.2 gm. of α-acetobromorhamnose in 40 ml. of benzene was added dropwise over a period of two hours to a mixture of 1.3 gm. of 17β-estradiol-3-acetate and 3.5 gm. of commercial silver carbonate in 50 ml. of absolute benzene at the boiling temperature of the solvent, while 15 ml. of benzene were distilled out of the reaction mixture simultaneously. The reaction mixture was then refluxed for another 4 hours. Thereafter, the silver carbonate was filtered off, and the filtrate was evaporated to dryness in vacuo. The residual crude product was purified by chromatography on silicagel (15% deactivated), and then recrystallized from ethanol. M.P. 96–100° C. Yield: 1.7 gm. (20% of theory).

EXAMPLE 10

(a) 3-methoxy-estra-1,3,5(10)-triene-17β-yl-2',3',4'-tri-O-acetyl-L-rhamnopyranoside A solution of 5 gm. of α-acetobromorhamnose in 50 ml. of absolute benzene was added dropwise over a period of two hours to a mixture of 3 gm. of 17β-estradiol-3-methylether and 10 gm. of commercial silver carbonate in 50 ml. of absolute benzene at the boiling temperature of the solvent, while simultaneously 10–15 ml. of benzene were distilled out of the reaction mixture. The reaction mixture was then refluxed for another two hours. Thereafter, the silver carbonate was filtered off, and the filtrate was evaporated by dryness in vacuo. The residual crude product was purified by chromatography on silicagel (15% deactivated), and then recrystallized from ethanol. M.P. 121–124° C. Yield: 3.4 gm. (58% of theory).

(b) 3-methoxy-estra-1,3,5(10)-triene-17β-yl-L-rhamnoside 2.8 gm. of 3 - methoxy-estra-1,3,5(10)-triene-17β-yl-2′,3′,4′-tri-O-acetyl-L-rhamnopyranoside were dissolved in 700 ml. of methanol, and the solution was admixed with a solution of 1.0 gm. of $K_2CO_3$ in 10 ml. of water. After standing for 2 hours at room temperature, the reaction solution was evaporated to dryness in vacuo, and the residue was extracted with chloroform several times. The chloroform extracts were washed with water, dried with $Na_2SO_4$ and evaporated to dryness. The residual crude product was recrystallized from methanol/water. M.P. 182–184° C. Yield: 2 gm. (95% of theory).

EXAMPLE 11

3-methoxy-estra-1,3,5(10)-triene-17β-yl-1′,2′-O-orthoacetyl-L-rhamnopyranoside

A solution of 12 gm. of α-acetobromorhamnose in 180 ml. of absolute benzene was added dropwise over a period of two hours to a mixture of 4.4 gm. of 17β-estradiol-3-methylether and 15.0 gm. of freshly precipitated silver-carbonate in 120 ml. of absolute benzene at the boiling point of the solvent while simultaneously 20 ml. of benzene were distilled out of the reaction mixture. The reaction mixture was refluxed for another two hours. Thereafter, the silver carbonate was filtered off, and the filtrate was evaporated to dryness in vacuo. The residual 3-methoxy-estra-1,3,5(10) - triene - 17β-yl-1′,2′-O-orthoacetyl-3′,4′-di-O-acetyl-L-rhamnopyranoside was dissolved without further purification in 500 ml. of methanol, and the solution was admixed with a solution of 7 gm. of potassium carbonate in 50 ml. of water. After standing two hours at room temperature, the reaction solution was evaporated to dryness in vacuo, and the residue was extracted with chloroform several times. The chloroform extracts were washed with water, dried with $Na_2SO_4$ and evaporated to dryness. The residual crude product was recrystallized from ethanol/water. M.P. 192–195° C. Yield: 1 gm. (90% of theory).

EXAMPLE 12

3-methoxy-estra-1,3,5(10)-triene-17β-yl-1′,2′-O-orthoacetyl-3′,4′-di-O-acetyl-L-rhamnopyranoside A solution of 400 mg. of 3-methoxy-estra-1,3,5(10)-triene-17β-yl-1′,2′-O-orthoacetyl - L - rhamnopyranoside (described in Example 11) in 15 ml. of pyridine and 15 ml. of acetanhydride was allowed to stand overnight at room temperature. Thereafter, the reaction solution was diluted with water and extracted several times with chloroform. The united chloroform extracts were washed successively with dilute sulfuric acid, saturated aqueous sodium bicarbonate solution, and water, dried with $Na_2SO_4$, evaporated to dryness in vacuo and the residual crude product was recrystallized from ethanol/water. M.P. 135–137° C. Yield: 400 mg. (80% of theory).

EXAMPLE 13

Potassium 3-sulfoxy-estra-1,3,5(10)-triene-17β-yl-rhamnopyranoside 1 gm. of 3-hydroxy-estra - 1,3,5(10) - triene-17β-yl-2′,3′,4′-tri-O-acetyl - L - rhamnopyranoside (described in Example 3) and 0.53 gm. of amidosulfonic acid were dissolved in 7 ml. of pyridine, and the solution was stirred for 1½ hours at 90° C. in an atmosphere of nitrogen. Thereafter, the reaction solution was diluted with 50 ml. of ether, and the precipitate formed thereby was filtered off and dried. The crude product was extracted several times with methylenechloride, and the united extracts were evaporated to dryness in vacuo at 30° C. The residue was dissolved in a mixture of 50 ml. of methanol and 80 ml. of a 12% methanolic potassium hydroxide solution, and the solution was stirred at room temperature for 1 hour. The estrogen sulfate was precipitated by addition of 300 ml. of ether, purified by chromatography on silicagel with chloroform to which increasing quantities of ethanol were added, and recrystallized from ether/methanol. M.P. 158° C. (pink coloring), 185° C. (decomposition). Yield: 560 mg. (57% of theory).

EXAMPLE 14

3-benzyloxy-estra-1,3,5(10)-triene-17β-yl-1′,2′-O-orthoacetyl-3′,4′-di-O-acetyl-L-rhamnopyranoside 33 ml. of 2,6-lutidine were added dropwise to a solution of 40 gm. of α-acetobromorhamnose and 20 gm. of estradiol-3-benzylether in 240 ml. of chloroform at 0° C. accompanied by stirring. The reaction solution was allowed to stand for 48 hours at room temperature, and then the excess of lutidine was extracted with 2 N HCl. The chloroform phase was washed successively with saturated aqueous sodium bicarbonate solution and water, dried with $Na_2SO_4$ and evaporated to dryness in vacuo. The residue was separated by chromatography on aluminum oxide (activity level III) with benzene, to which increasing quantities of ethylacetate were added. M.P. 135–142° C. Yield: 14.5 gm. (41.4% of theory).

The compounds according to the present invention, that is, those embraced by Formula I above, have useful pharmacodynamic properties. More particularly, the compounds of the present invention exhibit estrogenic activity in warm-blooded animals, such as rats, and are therefore useful for the therapeutic treatment of menopausal syndrome. Moreover, they can be used for gynecological indications, such as for the treatment of primary or secondary amenorrhea, endometritis and colpitis. Furthermore, in combination with a gestagen, the compounds of the present invention produce a hormonal contraceptive effect.

The estrogenic acivity of the compounds according to the present invention was ascertained and compared with that of estrone sulfate, using in principle the standard test method of Dorfman and Dorfman, Endocrinology 55, 65 (1954): Infantile female laboratory rats, 21 to 23 days old, with an average body weight of 38 gm. at the beginning of the test, received a single peroral dose of the compound under investigation in aqueous solution by means of an esophageal sound. Equimolar doses of the compounds were administered, each dose corresponding to 0.1 mgm./kg. of estrone sulfate. Control animals were administered an equal volume of the vehicle only in the same manner.

48 hours after this peroral administration the rats were sacrificed by ether inhalation, and their uteri were excised from the ovaries to the vagina. After squeezing out the secreted fluids, the moist weight of each uterus was determined.

The increase in the weight of the uterus of the animals treated with the compound under investigation over the weight of the uterus taken from the placebo-treated control animals served as a measure of the estrogenic activity.

The following table shows the results obtained with two representative members of the genus represented by Formula I, namely:

(A) 3-acetoxy-estra-1,3,5(10)-triene - 17β - yl-1′,2′-O-orthoacetyl-3′,4′-di-O-acetyl-β-L-rhamnopyranoside, (B) 3-methoxy-estra - 1,3,5(10) - triene-17β-yl-1′,2′-O-orthoacetyl-3′,4′-di-O-acetyl-β-L-rhamnopyranoside, and (C) 3-hydroxy-estra - 1,3,5(10) - triene-17β-yl-1',2'-O-orthoacetyl-3',4'-di-O-acetyl-β-L-rhamnopyranoside.

TABLE

| Compound | No. of animals | Weight of uterus in mgm. Average | Weight of uterus in mgm. Standard deviation | Increase in weight of uterus Mgm. | Increase in weight of uterus Percent over controls |
|---|---|---|---|---|---|
| A | 20 | 36.9 | 1.3 | 15.6 | 73.2 |
| Controls | 20 | 21.3 | 0.8 | 0 | 0 |
| B | 20 | 33.7 | 1.5 | 13.0 | 62.8 |
| Controls | 20 | 20.7 | 0.9 | 0 | 0 |
| C | 20 | 34.7 | 1.0 | 14.0 | 67.6 |
| Controls | 20 | 20.7 | 0.9 | 0 | 0 |
| Estrone sulfate | 20 | 30.9 | 1.2 | 10.0 | 47.8 |
| Controls | 20 | 20.9 | 0.6 | 0 | 0 |

Analogous results were obtained with the other compounds embraced by Formula I.

For pharmaceutical purposes the compounds according to the present invention are administered to warm-blooded animals perorally as active ingredients in customary dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like.

One effective dosage unit of the compounds according to the present invention is from 0.00083 to 0.0167 mgm./kg. body weight, preferably 0.00125 to 0.005 mgm./kg. body weight.

In addition to a compound of the present invention, such dosage unit compositions may also contain an effective dosage unit of one or more other active ingredients, such as a tranquilizer or a gestagen.

The following examples illustrate a few dosage unit compositions comprising a compound of the instant invention as an active ingredient and represent the best mode contemplated of putting the invention to practical use. The parts are parts by weight unless otherwise specified.

EXAMPLE 15

Coated pills

The pill core composition was compounded from the following ingredients:

| | Parts |
|---|---|
| 3 - acetoxy - estra - 1,3,5(10)-triene - 17β - yl-1',2'-O-orthoacetyl-3',4'-di-O - acetyl - β - L - rhamnopyranoside | 0.3 |
| Secondary calcium phosphate | 37.2 |
| Corn starch | 10.0 |
| Polyvinylpyrrolidone | 2.0 |
| Cellulose, microcrystalline | 5.0 |
| Magnesium stearate | 0.5 |
| Total | 55.0 |

Compounding procedure:

The estradiol-17β-rhamnoside compound was intimately admixed with the calcium phosphate, the mixture was combined with the corn starch, and the resulting mixture was granulated with an aqueous 10% solution of the polyvinylpyrrolidone through a 1 mm.-mesh screen. The granulate was dried at 40° C., again passed through the screen, and then admixed with the remaining ingredients. The finished composition was compressed into 55 mgm.-pill cores, which were then coated with a thin shell consisting essentially of sugar and talcum, and the coated pills were polished with beeswax. Each pill contained 0.3 mgm. of the estradiol-17β-rhamnoside compound and, when administered perorally to a warm-blooded female animal of about 60 kg. body weight in need of such treatment, produced very good estrogenic effects.

EXAMPLE 16

Coated pills with combination of estrogenic and progestational agents

The pill core composition was compound from the following ingredients:

| | Parts |
|---|---|
| 3 - methoxy - estra - 1,3,5(10)-triene - 17β - yl-1',2' - O - orthoacetyl 3',4' - di - O - acetyl - β-L-rhamnopyranoside | 0.075 |
| 17 - hydroxy - 19 - nor - 17α - pregn - 5(10)-ene-20-yn-3-one (norethynodrel) | 3.0 |
| Secondary calcium phosphate | 34.425 |
| Corn starch | 10.0 |
| Polyvinylpyrrolidone | 2.0 |
| Cellulose, microcrystalline | 5.0 |
| Magnesium stearate | 0.5 |
| Total | 55.0 |

The coated pills were manufactured in a manner analogous to that described in Example 15. Each coated pill contained 0.075 mgm. of estradiol-17β-rhamnoside compound and 3.0 mgm. or norethynodrel and, when administered perorally to a warm-blooded female animal of about 60 kg. body weight, produced contraceptive effects.

EXAMPLE 17

Tablets

The tablet composition was compounded from the following ingredients:

| | Parts |
|---|---|
| 3 - hydroxy - estra - 1,3,5(10) - triene - 17β - yl-1',2' - O - orthoacetyl - 3',4' - di - O - acetyl-β-L-rhamnopyranoside | 1.0 |
| Lactose | 84.0 |
| Potato starch | 30.0 |
| Polyvinylpyrrolidone | 4.0 |
| Magnesium stearate | 1.0 |
| Total | 120.0 |

Compounding procedure:

The estrodiol-17β-rhamnoside compound was intimately admixed with the lactose and the potato starch, the mixture was granulated with an ethanolic 15% solution of the polyvinylpyrrolidone through a 1.5 mm.-mesh screen, the granulate was dried at 40° C. and again passed through a 1.0 mm.-mesh screen, the dry granulate was admixed with the magnesium stearate, and the composition was compressed into 120 mgm.-tablets. Each tablet contained 1.0 mgm. of the estradiol-17β-rhamnoside compound and, when administered perorally to a warm-blooded female animal of about 60 kg. body weight in need of such treatment, produced very good estrogenic effects.

EXAMPLE 18

Coated pill with combination of estrogenic agent (in coating) and transquilizer (in core)

The pill core composition was compounded from the following ingredients:

| | Parts |
|---|---|
| 7 - chloro - 1,3 - dihydro - 3 - hydroxy - 5 - phenyl-2H-1,4-benzodiazepin-2-one | 10.0 |
| Secondary calcium phosphate | 88.5 |
| Potato starch | 21.0 |
| Polyvinylpyrrolidone | 9.0 |
| Alginic acid | 10.5 |
| Magnesium stearate | 1.0 |
| Total | 140.0 |

Compounding procedure:

The benzodiazepinone compound was granulated with an ethanolic 25% solution of the polyvinylpyrrolidone through a 1.5 mm.-mesh screen, the granulate was dried at 40° C., again passed through a 1.0 mm.-mesh screen, admixed with the remaining ingredients, and the composition was compressed into 140 mgm.-pill cores. The cores were then coated with a thin shell consisting essentially of talcum and sugar. Thereafter, the coated pills were provided with another exterior shell consisting of a sufficient quantity of a powdery mixture of talcum and 10% by weight of 3-acetoxy-estra-1,3,5(10)-triene-17β-yl-1',2'-O-orthoacetyl-3',4' - di - O - acetyl - β-L-rhamnopyranoside to add 0.3 mgm. of the latter to each coated pill; the second shell was applied with the aid of an aqueous gum arabic-sugar solution. Finally, double-coated pills were polished with beeswax. Each pill contained 0.3 mgm. of the estradiol-17β-rhamnoside compound and 10.0 mgm. of the benzodiazepinone compound and, when administered perorally to a warm-blooded female animal of about 60 kg. body weight in need of such treatment, produced very good estrogenic and tranquilizing effects.

Analogous results were obtained when an equal amount of any one of the other compounds embraced by Formula I above was substituted for the particular estrodiol-17β-rhamnoside compounds in Examples 15 to 18. Likewise, the amount of active ingredient in these examples may be varied to achieve the dosage unit range set forth above, and the amounts and nature of the inert pharmaceutical carrier ingredients may be varied to meet particular requirements.

We claim:
1. A compound of the formula

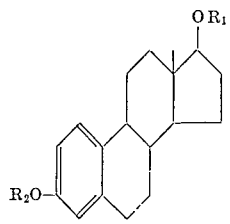

wherein $R_1$ is

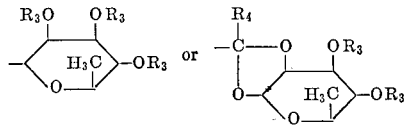

where
$R_3$ is hydrogen or alkanoyl of 2 to 4 carbon atoms,
$R_4$ is alkyl of 1 to 3 carbon atoms, and
$R_2$ is hydrogen, alkyl of 1 to 3 carbon atoms, alkanoyl of 2 to 4 carbon atoms, benzyl, tetrahydropyranyl or $MeO_3S-$, where Me is an alkali metal.

2. A compound of the formula

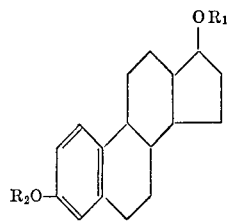

wherein $R_1$ is

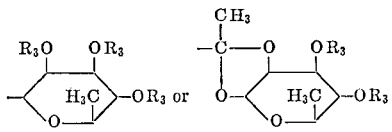

where $R_3$ is hydrogen or acetyl, and
$R_2$ is hydrogen, methyl, acetyl, benzyl, tetrahydropyranyl or $KO_3S-$.

3. A compound according to claim 2, which is 3-acetoxy - estra - 1,3,5(10) - triene - 17β - yl - 1',2' - O - orthoacetyl-3',4'-di-O-acetyl-β-L-rhamnopyranoside.

4. A compound according to claim 2, which is 3-methoxy - estra - 1,3,5 (10) - triene - 17β - yl - 1',2' - O-orthoacetyl-3',4'-di-O-acetyl-β-L-rhamnopyranoside.

5. A compound according to claim 2, which is 3-hydroxy - estra - 1,3,5(10) - triene - 17β - yl - 1',2'-O - orthoacetyl-3',4'-di-O-acetyl-β-L-rhamnopyranoside.

6. A compound according to claim 2, which is 3-benzyloxy - estra - 1,3,5(10) -triene - 17β - yl - 1',2' - orthoacetyl-L-rhamnopyranoside.

7. A compound according to claim 2, which is 3-hydroxy - estra - 1,3,5(10) - triene - 17β - yl - 1',2' - O-orthoacetyl-L-rhamnopyranoside.

8. A compound according to claim 2, which is potassium 3 - sulfoxy - estra-1,3,5(10) - triene - 17β - yl - L-rhamnopyranoside.

9. A compound according to claim 2, which is 3-methoxy - estra - 1,3,5(10) - triene - 17β - L - rhamnopyranoside.

References Cited
UNITED STATES PATENTS
3,276,624   9/1966   Cantrall et al. _____ 260—210.5

OTHER REFERENCES
"Chem. Abst.," vol. 58, 1963, p. 10291.

LEWIS GOTTS, Primary Examiner
J. R. BROWN, Assistant Examiner

U.S. Cl. X.R.
424—182